United States Patent [19]

Abe et al.

[11] Patent Number: 4,578,996
[45] Date of Patent: Apr. 1, 1986

[54] GAS-FLOW MEASURING APPARATUS AND METHOD

[75] Inventors: Tomoaki Abe; Atsushi Suzuki, both of Oobu, Japan

[73] Assignee: Nippondenso Co., Ltd., Kariya, Japan

[21] Appl. No.: 643,830

[22] Filed: Aug. 24, 1984

[30] Foreign Application Priority Data

Sep. 2, 1983 [JP] Japan .............................. 58-161479

[51] Int. Cl.$^4$ .............................................. G01F 1/68
[52] U.S. Cl. .................................... 73/204; 123/491; 73/118
[58] Field of Search .................. 73/204; 123/488, 491, 123/494, 118

[56] References Cited

U.S. PATENT DOCUMENTS

| | | |
|---|---|---|
| 4,384,484 | 5/1983 | Kohama et al. |
| 4,393,702 | 7/1983 | Kohama et al. |
| 4,399,697 | 8/1983 | Kohama et al. |
| 4,413,514 | 11/1983 | Bowman .............. 73/204 |
| 4,450,719 | 5/1984 | Nishimura et al. .................. 73/204 |

Primary Examiner—Herbert Goldstein
Attorney, Agent, or Firm—Cushman, Darby & Cushman

[57] ABSTRACT

A gas-flow measuring apparatus and method providing an accurate measurement of the gas-flow in, for example, an internal combustion engine. The quantity of the gas-flow is measured with a measuring device including a heater mounted in the gas-flow, and a temperature-responsive element mounted in proximity to the heater. The temperature-responsive element is heated by the heater and cooled by the gas-flow and thus, has a temperature which varies in accordance with the quantity of gas-flow. The temperature-responsive element provides an output signal corresponding to the temperature and thus to the quantity of gas-flow. Power is provided to the heater when the engine is operating. A processing apparatus detects the start of power being provided to the heater. The processor then counts the time from when the start is detected. The processor then detects when the counted time is within a predetermined time interval when the temperature of the temperature-responsive element is effectively unrelated to the quantity of gas-flow. The processor then lowers the signal level of the output signal during that time interval to provide a corrected output signal indicative of the actual quantity of gas-flow in the engine.

15 Claims, 17 Drawing Figures

GAS-FLOW MEASURING APPARATUS AND METHOD

BACKGROUND OF THE INVENTION

The present invention relates to a thermal process gas-flow measuring apparatus and method used for detecting the condition of, for example, an engine fuel injection control apparatus by measuring the amount of intake gas supplied to the engine.

In a conventional electronic fuel injection control apparatus for a vehicular engine, data regarding the condition of the engine such as its rpm or the amount of intake gas is detected and measured. The basic amount of fuel injected for every revolution of the engine is calculated in accordance with the detection/measurement signal. This basic amount is corrected in accordance with parameter data such as data about the temperature of the cooling water for the engine. Thus, the final amount of fuel injection is calculated to control a fuel injection valve.

In general, the fuel injection valve receives fuel at a predetermined pressure. The valve comprises an electromagnetic injection valve whose amount of fuel injection is determined when the valve is on. Therefore, the fuel injection data comprises a signal for designating when the electromagnetic injection valve is on. The on signal is synchronized with the revolution of the engine so as to control the injection of the fuel.

This conventional fuel injection control apparatus for an engine generally employs a low loss, highly precise, thermal process, gas-flow measuring apparatus capable of measuring the amount of gas flow over a wide range.

Typical examples of a conventional fuel injection control apparatus of this type are described in U.S. Pat. Nos. 4,384,484, 4,393,702 and 4,399,697. Each of these conventional fuel injection control apparatuses comprises a heater supplied with a heating current and having a temperature-resistance characteristic, and a resistive element which receives heat from the heater, the element also having a temperature-resistance characteristic. The heater and the resistive element are arranged in an intake pipe. The temperatures of the heater and the resistive element are read from the resistances thereof, and the heat radiation conditions of the heater and the resistive element which are influenced by a gas flow are also measured. A signal corresponding to the measured amount of gas flow is generated.

However, in such a thermal process gas measuring apparatus, the heater must be at a higher temperature than the ambient temperature when a heating current is flowing through it. Immediately after the heating current begins to flow in the heater, the temperature of the heater is not at the necessary heated state. Until the heater attains thermal equilibrium, an output signal is generated from the heater independently of the amount of gas flow.

The heater and the resistive element which constitute the measuring apparatus are wound around a heat-resistant frame to provide good mechanical strength. The frame must also attain thermal equilibrium so as to cause the measuring apparatus to operate normally. The frame temperature is the same as that of gas under normal circumstances. When the heating current is supplied to the heater, the frame must also be heated to the same temperature as that of the heater. Since the frame temperature is the same as that of the normal gas, the heater and the frame are heated to the same prescribed temperature. Therefore, initially, when the heating current flows through the heater, the output signal erroneously indicates that the amount of gas flow is larger than it actually is.

When such an erroneous output signal from the gas-flow measuring apparatus is supplied to the fuel injection control apparatus which calculates the injection quantity, the air/fuel ratio may become excessive immediately after the engine is started. As a result, ignition efficiency is degraded, the emission level is decreased, and drivability after the engine is started becomes impaired.

SUMMARY OF THE INVENTION

It is an object of the present invention to provide a gas-flow measuring method and apparatus comprising a heater heated with a heating current to a specific temperature, and a resistive element having a temperature-resistance characteristic so as to receive heat from the heater and to serve as a thermometer, wherein an output signal is generated to indicate an accurate amount of gas flow when a heating current begins to flow through the heater.

It is another object of the present invention to provide a gas-flow measuring apparatus and method for measuring the amount of intake gas accurately in accordance with the starting conditions of the engine, and for performing an accurate calculation of the fuel injection quantity immediately after the engine is started.

The gas-flow measuring apparatus and method according to the present invention is based on the assumption that an output error is present immediately after the heating current is supplied to the heater. The output signal is decreased for a specific time interval (i.e., until the heater temperature becomes set in an equilibrium state).

Until the heater is heated to the specific temperature, the output signal from the measuring apparatus indicates that the gas flow is larger than it actually is since there is a correspondance between a large gas flow and a large amount of heat radiated from the heater. Since the erroneous output changes immediately after the heating current starts flowing through the heater, the output signal decreases in accordance with the error, thereby obtaining an accurate signal representing the amount of gas. When the corrected measurement signal is supplied to, for example, a fuel injection control apparatus of an engine, an accurate fuel injection can be calculated from the very beginning of the operation of the engine. Therefore, fuel injection can be properly controlled in accordance with the actual operating state of the engine immediately after the engine is started.

DETAILED DESCRIPTION OF THE PREFERRED EMBODIMENT

Figure 1:
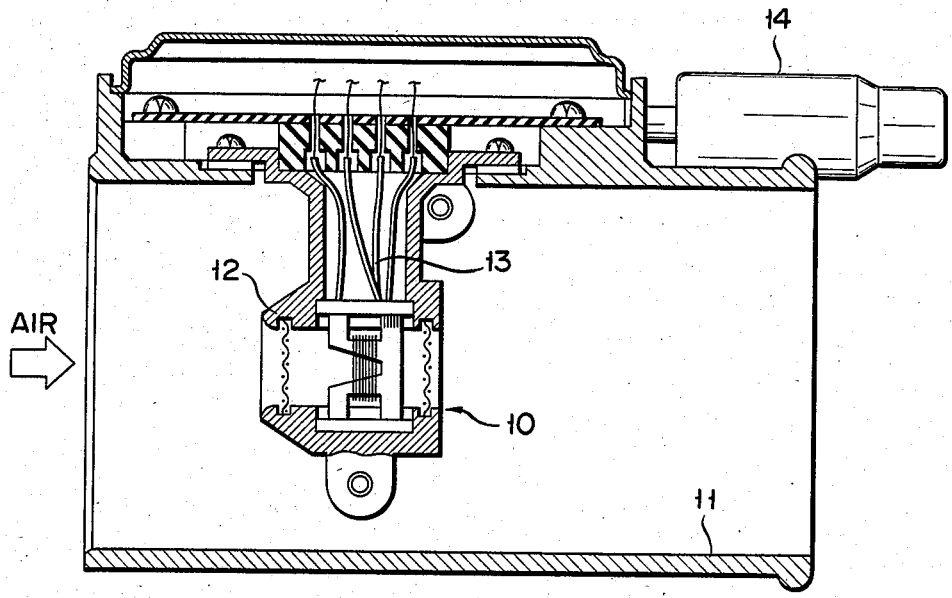
FIG. 1 is a sectional view of an intake pipe portion of an engine so as to explain the operation of a gas flow measuring apparatus according to an embodiment of the present invention.

FIG. 1 shows mounted gas-flow measuring elements 10 of a gas-flow measuring apparatus which measures the amount of intake gas supplied to the engine. The measuring element 10 is arranged inside a gas flow duct 11 which constitutes part of an intake pipe. The gas flow duct 11 receives gas from an air cleaner (not shown) in the direction indicated by the arrow and supplies it to the respective cylinders of the engine through a throttle valve mechanism.

More particularly, a cylindrical sensing body 12 is disposed coaxially with the gas flow duct 11. The measuring element 10 obtained by winding a heater and a temperature-sensing resistive element around a frame made of, for example, ceramic is held in the sensing body 12. The sensing body 12 is arranged so as not to offer resistance against the gas flow, and the gas flow passes through the sensing body 12 in the gas flow duct 11.

A heating current circuit for supplying a heating current to the measuring element 10 and to a detection signal circuit therefor are commonly connected through a lead wire 13 to a control circuit mounted on the duct 11. The gas flow signal detected by the control circuit is supplied to an engine control unit (not shown) through a terminal 14.

Figure 2:
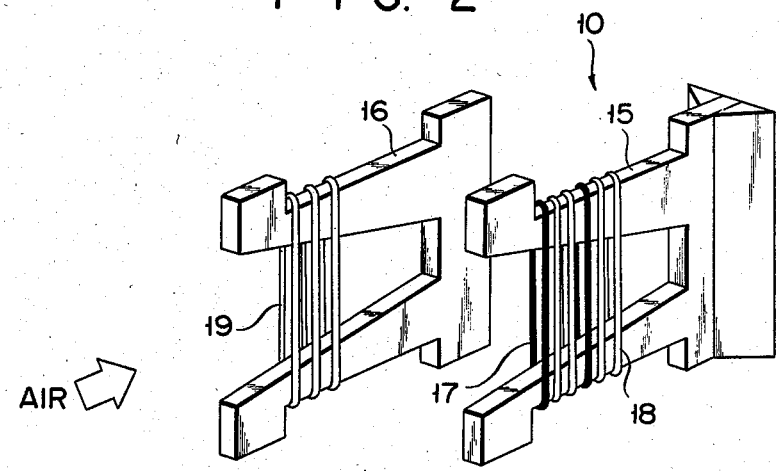
FIG. 2 is a perspective view of a gas flow measuring element used in the apparatus shown in FIG. 1.

FIG. 2 shows the gas-flow measuring element 10 when taken out of the apparatus. First and second frames 15 and 16 made of ceramic plates are spaced from each other, and are parallel to each other along the gas flow direction indicated by the arrow. A heater 17 comprises a platinum wire (i.e., a resistive wire) serving as a heat source which is wound around the first frame 15. A resistive wire 18 made of platinum and serving as a thermometer whose electrical resistance changes in accordance with a change in temperature is also wound around the first frame 15. The winding positions of the heater 17 and the resistive wire 18 are alternately wound such that heat from the heater 17 is effectively conducted to the resistive wire 18. A resistive wire 19 serving as a thermometer in the same manner as the resistive wire 18 is wound around the second frame 16. Heat is not conducted from the heater 17 to the resistive wire 19. The resistive wire 19 is used to measure the temperature of an intake gas.

The measuring element 10 operates when the heating current is supplied to the heater 17. The resistance of the resistive wire 18, wound around the first frame 15 as it is around the heater 17, is determined by the amount of heat generated from the heater 17, the mass flow rate, and the temperature-resistance characteristic of the resistive wire 18. The resistance of the resistive wire 19 wound around the second frame 16 is determined by the gas temperature and the temperature-resistance characteristic of the resistive wire 19 independent of the heater 17. Therefore, by measuring the relationship between the resistances of the resistive wire 18 and 19, an output signal corresponding to the amount of gas flow can be extracted. A gas flow signal may be detected by a means described, for example, in U.S. Pat. No. 4,393,702.

For example, when the measuring element 10 is used at room temperature, the temperature of the heater 17 falls within the range between 100° C. to 250° C., and the temperature of the resistive wire 18 falls within the range between 50° C. to 80° C. In this case, the first frame is set at a temperature higher than room temperature.

The temperatures of the heater 17, the resistive wire 18 and the frame 15 are at room temperature before current is supplied. When the heating current flows through the heater 17 in this condition, heat is generated to heat the gas and the frame 15 when the heater is turned on. The heat generated from the heater 17 is determined by the magnitude of the heating current. In order to heat the heater 17, the resistive wire 18 and the frame 15 to a predetermined temperature, the heater 17 must generate excessive heat in this initial period. Since the output signal from the measuring element 10 is given as the voltage to which the heating current flowing through the heater 17 is converted, when the heater 17 is turned on, the measuring element 10 generates an output signal erroneously representing that the amount of gas is larger than it actually is. This output signal is then supplied to the engine control unit.

Figure 3:
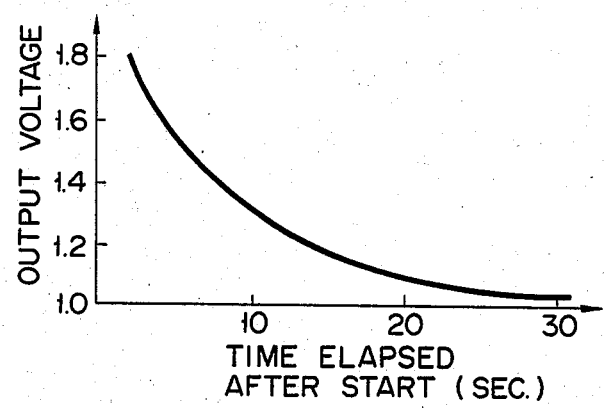
FIGS. 3 and 4 are graphs explaining the operating characteristics of the gas flow measuring element.

FIG. 3 shows an excessive output state. Referring to FIG. 3, the measuring element 10 is set in a constant gas flow, and an output after about 60 seconds is given to be 1.0 as a function of time. One second after the heating current is supplied, the output exceeds 80% of a normal output representing an actual amount of gas flow. Twenty seconds after the heating current is supplied, the output exceeds 20% of the normal output. This can also be applied to the range of gas flow required when a vehicle is started. The curve in the graph of FIG. 3 is exponential.

Figure 4:
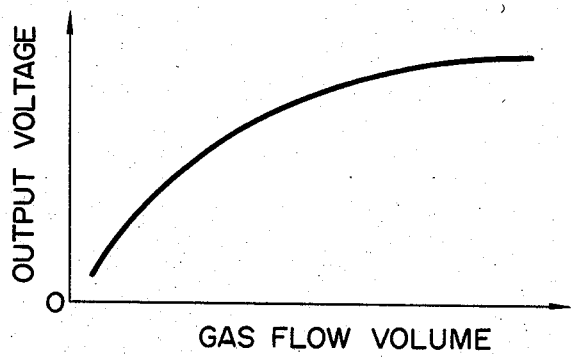
Figure 5:
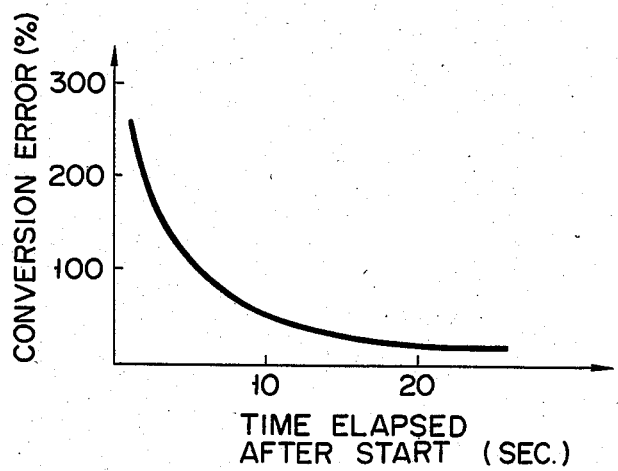
FIG. 5 is a graph showing the measurement output signal characteristics.

FIG. 3 shows how the output changes from the gas flow measuring element 10. The relationship between this output and the actual gas flow is not proportional and is given by FIG. 4. The relationship in FIG. 4 can be represented in the relationship shown in FIG. 5 wherein the output voltage from the measuring element 10 is converted to the amount of gas flow as a function of time. Immediately after the heating current flows through the measuring element 10, the conversion error becomes more than 200%. When this output from the measuring element 10 is used without correction, proper control cannot be performed when the engine is started.

Figure 6:
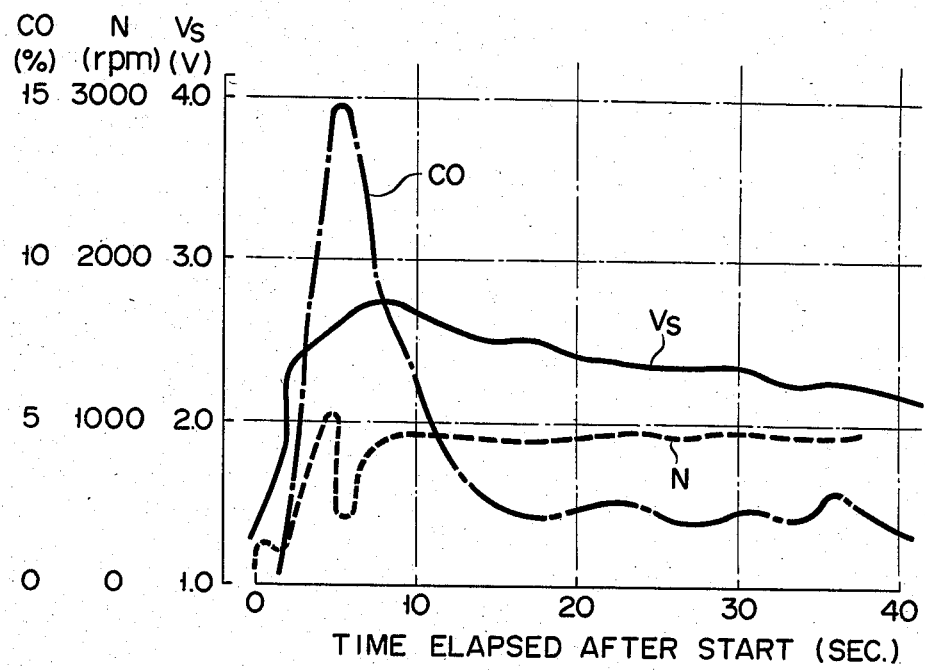
FIG. 6 is a graph explaining the engine control operation by using the output signal from the gas-flow measuring element.

FIG. 6 is a graph showing an output $V_S$ as opposed to the amount of gas flow, the concentration of CO in the exhaust gas, and as opposed to the engine's rotational speed N when the measuring element 10 built into a vehicle engine is operated. In this case, since a rich mixture is supplied to the engine and 15% of the CO is exhaust, the engine speed is greatly decreased.

Figure 7:
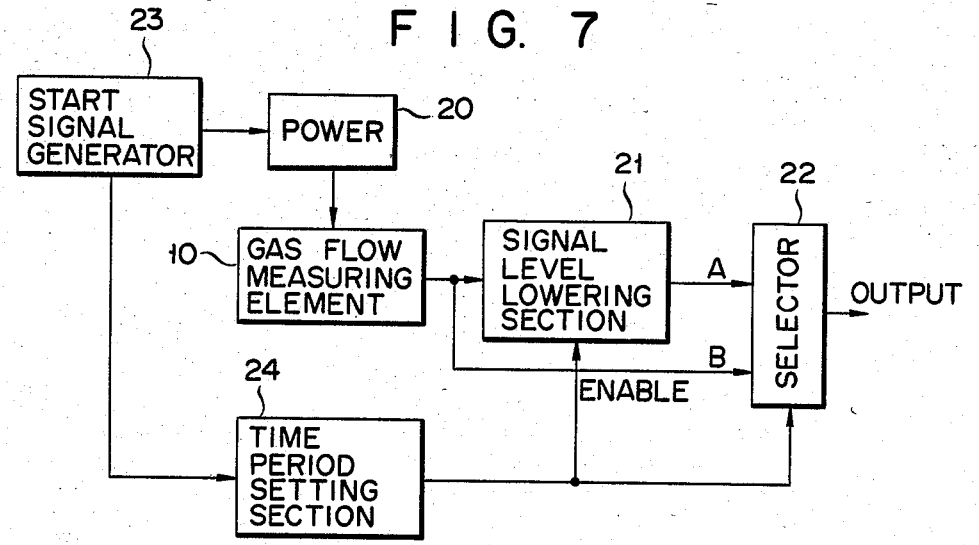
FIG. 7 is a block diagram of a thermal process gas-flow measuring apparatus according to the embodiment of the present invention.

FIG. 7 shows a gas-flow measuring apparatus using the measuring element 10 in consideration of the above problems so as to decrease the output from the measuring element 10 between the start time and a specific time.

The heating current flows from a power source 20 to a gas-flow measuring element 10, and an output signal from the measuring element 10 is supplied to a signal-level lowering section 21. A corrected detection signal from the signal-level lowering section 21 is extracted through a selector 22. In this case, the detection signal from the measuring element 10 is also directly coupled to the selector 22. The selector 22 selects one of the corrected detection signals from the signal-level lowering section 21 and the detection signal from the measuring element 10. A timer or time-period setting section 24 detects a start signal from a start-signal generator 23 associated with an operation of an ignition switch or the like. The signal-level lowering section 21 is operated during the specific time interval starting after the power source 20 is started. The time-period setting section 24 then supplies a signal to the selector 22 so as to cause the selector 22 to select an output signal A generated from the signal-level lowering section 21.

The signal-level lowering section 21 lowers the output from the measuring element 10 within the time interval set by the time-period setting section 24, thereby obtaining an output signal representing the actual amount of intake gas.

When the specific time interval preset in the time-period setting section 24 has elapsed, and the temperatures of the heater of the measuring element 10 and the frame are increased and stabilized, the selector 22 selects a signal B from the measuring element 10.

Figure 8:
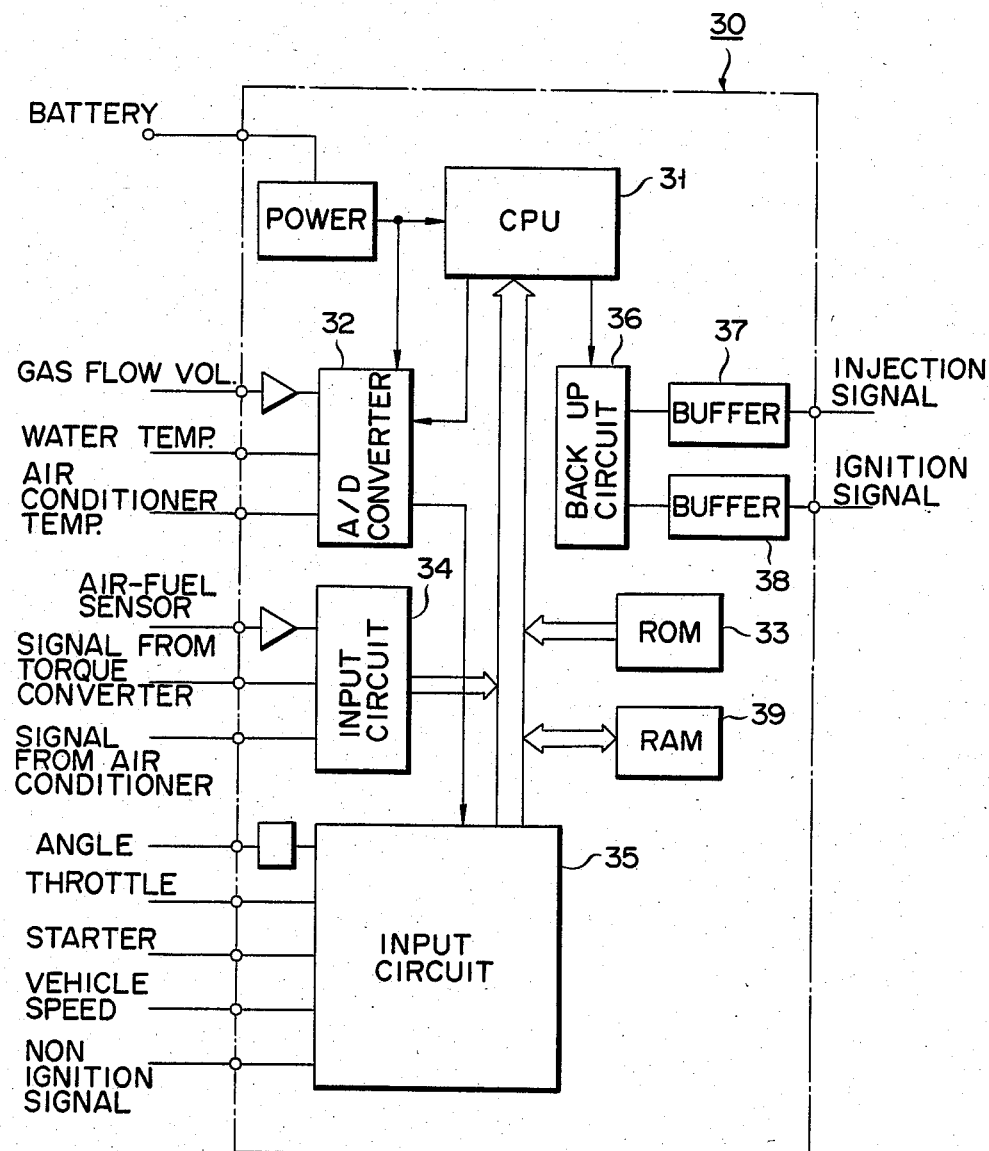
FIG. 8 is a detailed block diagram of the thermal process gas-flow measuring apparatus shown in FIG. 7.

FIG. 8 shows an engine control unit 30 including the start-signal lowering section which receives the output signal from the measuring element 10. The engine control unit 30 comprises a CPU 31 for generating an injection signal indicating that the electromagnetic fuel injection valve and an ignition signal are on. A gas-flow amount signal from the gas-flow measuring element 10 is supplied to an A/D converter 32 through an input buffer. The A/D converter 32 also receives a water temperature signal, an air conditioner temperature signal and so on. The A/D converter 32 performs A/D conversion in accordance with the instructions from the CPU 31 controlled by the control program stored in a ROM 33. The gas flow amount signal is converted by the A/D converter 32 to a digital signal. This digital signal is supplied to the CPU 31.

The engine control unit 30 also has input circuits 34 and 35. The input circuit 34 receives an air-fuel sensor output, a signal from a torque converter, and a signal from an air conditioner. The input circuit 35 receives an engine crank angle signal, a fully opened/fully closed throttle valve signal, a starter signal, a vehicle speed signal, and a non-ignition signal. The signals from the input circuits 34 and 35 are fetched by the CPU 31 in accordance with the control program. The CPU 31 calculates the fuel injection quantity and ignition timings in accordance with the input data.

The injection signal and the ignition signal from the CPU 31 are supplied to a back-up circuit 36 for performing minimum operations at any time of failure of the CPU 31 and are amplified by output buffers 37 and 38. The amplified injection and ignition signals are supplied to an electromagnetic fuel injection valve (not shown) and an ignition unit (not shown), respectively. Reference numeral 39 denotes a RAM used for temporary data storage.

Figure 9A:
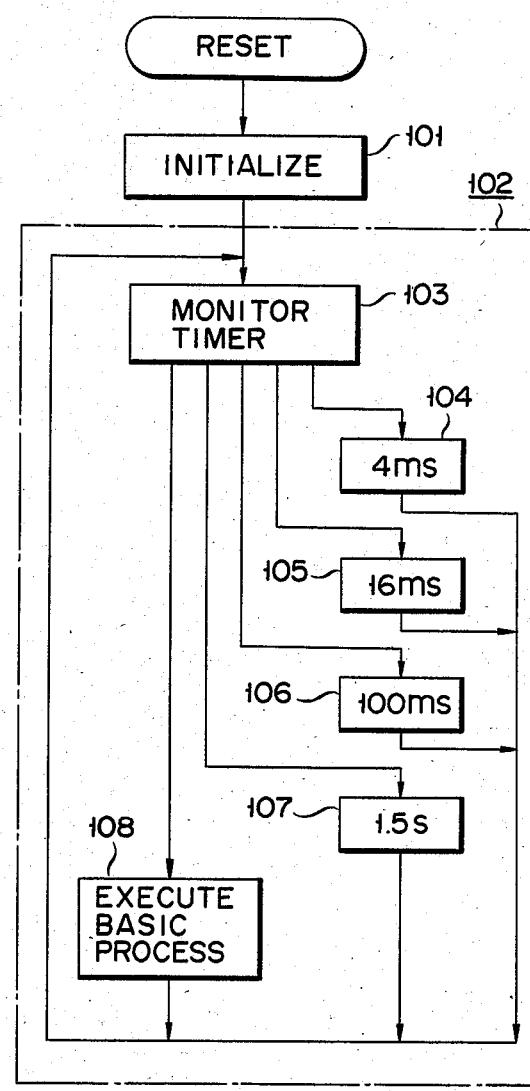
FIG. 9A is a flow chart explaining the operation of the apparatus shown in FIG. 8.

The CPU 31 in the engine control unit 30 executes the engine control program after it is reset in response to a reset signal. FIG. 9A is a flow chart explaining the operation of the engine control program. The initialization operation is performed in step 101. The initial values of the respective parameters and the operating mode of the CPU 31 are determined. When initialization is completed, a main loop 102 is performed. A counter in the CPU 31 is monitored by a monitor timer module 103 to control the start of periodic tasks 104, 105, 106 and 107 which are started every 4 ms, 16 ms, 100 ms and 1.5 sec, respectively. When the periodic tasks are not performed, basic processing 108 is executed.

Figure 9B:
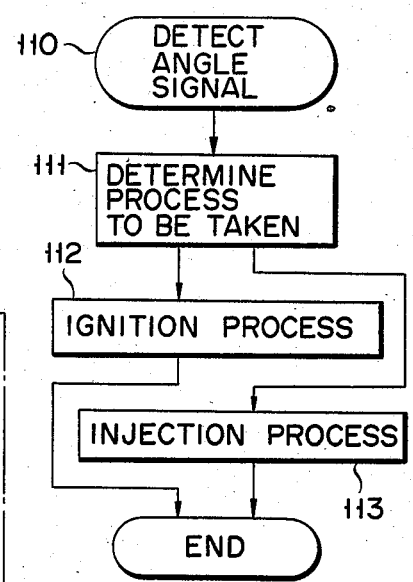
FIG. 9B is a flow chart explaining an interruption operation in the apparatus shown in FIG. 8.

An interruption is generated in response to a normal crank angle signal supplied from a rotary sensor (not shown) for calculating the rotational speed of the engine and for detecting injection or ignition timing, as shown in FIG. 9B. In other words, the CPU 31 performs normal crank angle interruption processing 110. The CPU 31 checks in step 111 whether ignition processing step 112 or injection processing step 113 should be performed. The interruption processing is cancelled after the operation corresponding to the decision result is completed.

Figure 10:
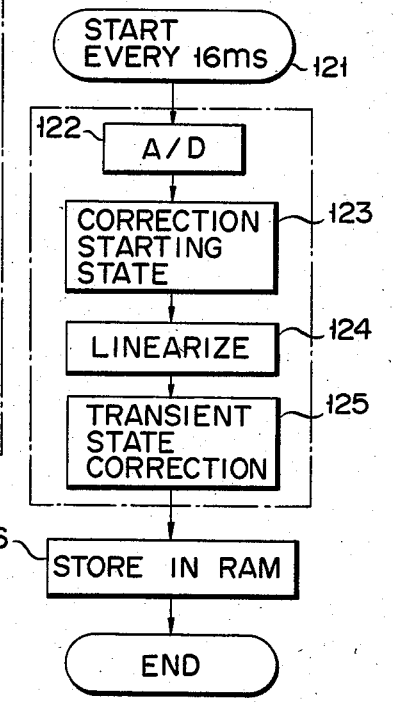
FIG. 10 is a flow chart explaining the correction operation for correcting the output signal from the gas-flow measuring element.

FIG. 10 shows a schematic flow of correction processing 121 of a gas flow signal from the gas flow measuring element 10. This processing is performed by part of the module groups of the periodic task 105 started every 16 ms in the monitor timer module 103.

In step 122, the output signal from the measuring element 10 is A/D converted. The analog output signal from the measuring element 10 is converted to a digital signal which is then used inside the CPU 31. The digital gas flow signal is properly corrected by the start correction module in step 123 and is linearized in step 124. In this manner, the output signal from the measuring element 10 is converted to a value proportional to the actual amount of gas flow. This conversion is performed by checking a table. However, when the relationship between the output signal and the amount of gas flow is expressed by a simple function, the conversion can be performed by calculating.

The gas flow signal thus obtained is further subjected to correction using the transient response correction in a transient correction processing step 125. As a result, a value which is almost the same as the true gas flow signal is stored in the RAM 39. Other processing is performed every 16 ms, and the flow returns to the monitor timer module 103 wherein a basic fuel injection quantity is calculated in the base processing module 108 in accordance with the calculated value in step 125 and the engine speed. Various correction values (e.g., warm-up data and acceleration data) are added to the basic fuel injection quantity to obtain a final fuel injection time period (pulse width of a pulse signal) so as to control the ON time of the fuel injection valve and hence the fuel injection quantity.

When the engine is started (i.e., when the heating current is supplied to the thermal process gas-flow measuring element 10), it generates a signal representing an amount of gas flow which is larger than the actual amount. In order to eliminate this drawback, an A/D-converted start signal correction step 123 is provided to decrease the detected amount of gas flow.

Figure 11:
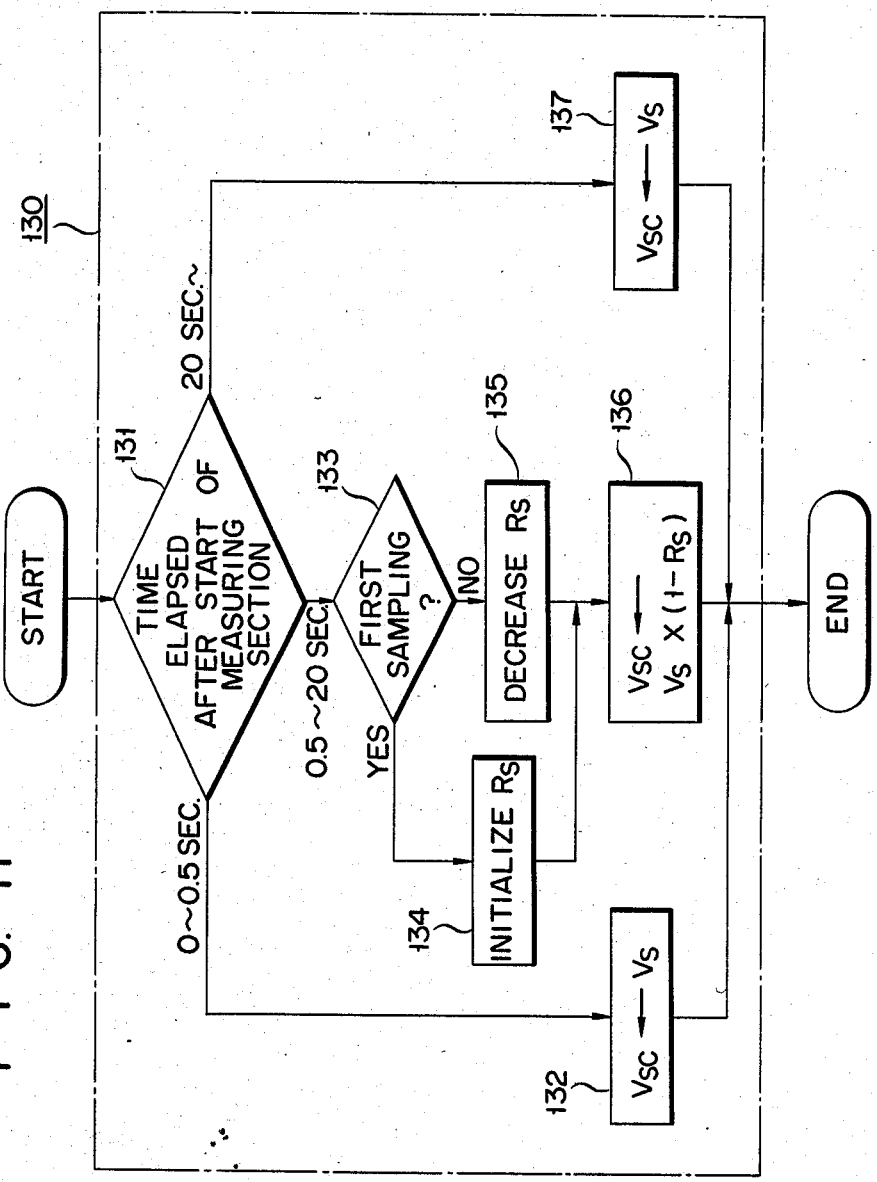
FIG. 11 is a flow chart explaining the operation for decreasing the measurement output signal from the element.

FIG. 11 is a flow chart of the start signal correction processing step 123. A software counter set in the periodic task 106 started every 100 ms is set at "0" in the initialization processing 102 of FIG. 9A. The count of the software counter is incremented by one every 100 ms until the count reaches 200. The time that the measuring element 10 is on (i.e., the 20-second period beginning when the ignition switch is turned on) is thus counted by this counter.

In the start signal correction module 130, time is detected in step 131. This module is disabled until a period of 0.5 seconds has elapsed after power is supplied. In step 132, the value $V_{SC}$ is obtained after the processing has been equalized with an output value $V_S$ from the gas-flow measuring element 10. This is because precise control can scarcely be performed using only a simple control circuit arrangement since the correction coefficient $R_S$ just after starting is very large, and since no adverse affect occurs even if special control is not performed since the fuel injection quantity is determined independently of the amount of gas flow immediately after the engine is started.

Between 0.5 seconds and 20 seconds after the measuring element 10 is energized, the flow advances to step 133. Since the correction coefficient $R_S$ is initialized to 0, if RS=0, the CPU 31 detects that step 133 is executed for the first time. In this case, the flow advances to step 134, and an initial value is given to the correction coefficient $R_S$. However, when the CPU 31 detects in step 133 that the correction coefficient $R_S$ is not zero, a value smaller than one is multiplied with the correction coefficient $R_S$, thereby decreasing the correction coeffiecient $R_S$.

In this embodiment, the decrease processing is performed in the gas-flow signal processing system. However, this decrease operation can be performed within a short period.

By using the resultant correction coefficient $R_S$, the nonprocessed gas flow signal $V_S$ is corrected to obtain the processed value $V_{SC}$ in step 136. This correction is preferably calculated in the manner below:

$$V_{SC}=V_S/(1+R_S).$$

In this embodiment, the above calculation is simply performed by utilizing software as follows:

$$V_{SC}=V_S\times(1-R_S).$$

When the correction coefficient $R_S$ is small, the error given by the above equation becomes small and can be neglected in the engine control operation.

When the CPU 31 detects in step 131 that a 20-second period has elapsed, the error of the gas flow signal $V_S$ is regarded as being insignificant. In this case, the flow advances to step 137, and $V_S$ is regarded to be $V_{SC}$.

In this manner, the gas flow signal $V_{SC}$ obtained by the start signal correction module 130 is used in place of the gas flow signal $V_S$, thereby precisely controlling the engine using a gas flow signal with a minimum amount of error for a predetermined period of time after the heating current flows through the measuring element 10.

Figure 12:
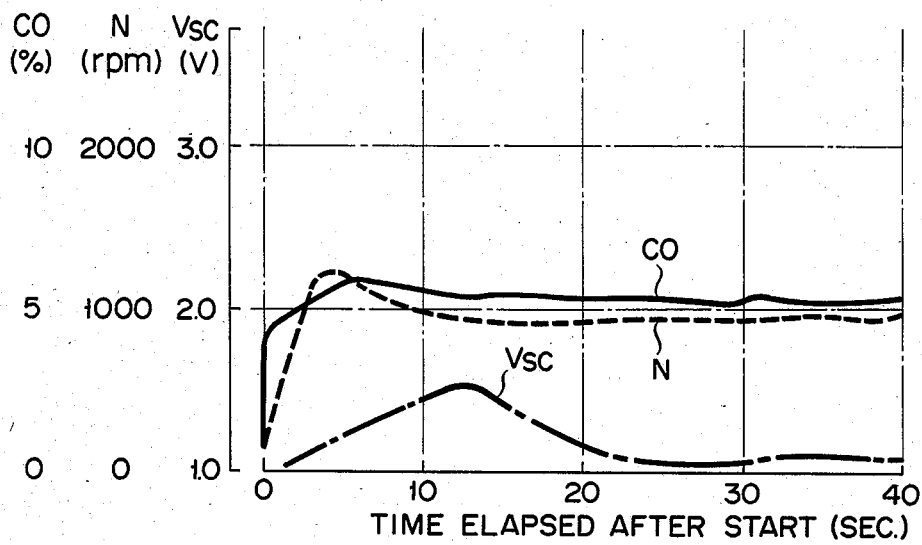
FIG. 12 is a graph explaining the engine control state when the measuring apparatus shown in FIG. 8 is used.

FIG. 12 is a graph showing the concentration of CO contained in the exhaust gas at the time the engine starts, the engine speed N and the gas flow signal $V_{SC}$ when the above-mentioned start signal correction processing is performed. In this case, as compared with the signal $V_S$ in FIG. 6, an excessive output error of the corrected signal $V_{SC}$ is eliminated, the CO concentration is lowered, and the engine speed N becomes ideal. The results shown in FIG. 12 are obtained when the throttle valve is fully opened. Even if the vehicle starts to move immediately after the engine is started, it can be precisely controlled in accordance with the gas flow signal.

Figure 13:
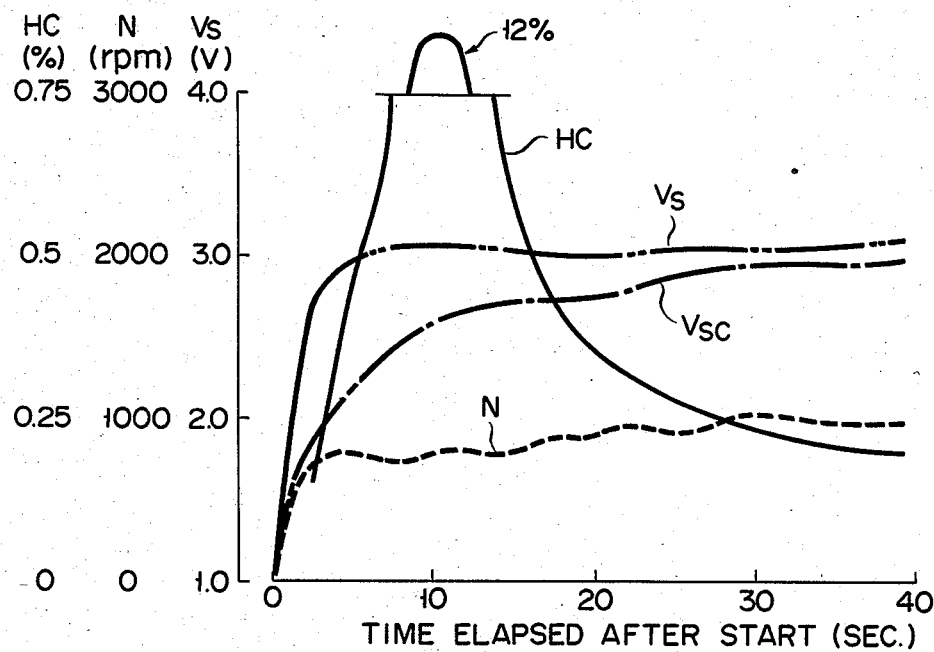
FIG. 13 is a graph explaining the state of the heating current when it is off for only a brief period of time.

In a special case wherein the gas-flow measuring element 10 is restarted after a very short period of time has elapsed since it was stopped, the CPU 31 in the engine control unit 30 is reset, and the start signal correction processing 130 (FIG. 11) is executed. However, since the temperature of the first frame has been wound with the heater 17 and the resistive element 18 has not decreased below the ambient gas temperature, the output signal from the measuring element 10 only has a small error. In this condition, when the correction operation described above is performed, an excessive correction can result in a shortage of fuel immediately after the engine is started. Incomplete ignition, a small increase in engine speed or backfiring can then occur. FIG. 13 shows characteristics of this case. Since the temperature of the first frame 15 or the like has not substantially decreased below the prescribed temperature, the measuring element 10 generates the output voltage $V_S$ with a small error.

However, when the above-mentioned correction is performed in this state, the corrected output $V_{SC}$ has a large error. The increase in engine speed N is very small, and the non-ignition caused by the shortage of fuel generates a great amount of HC. Even though this state only occurs very rarely, a countermeasure has been discovered.

Figure 14:
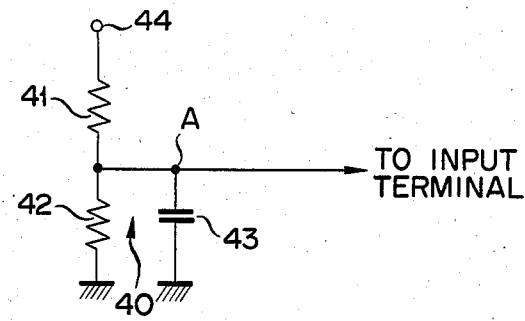
FIG. 14 is a circuit diagram explaining a means for detecting when the current is off briefly.

FIG. 14 shows a power-off time-measuring circuit 40 used in this situation. The correction circuit comprises a time constant circuit consisting of resistors 41 and 42, and a capacitor 43. A power source is connected to a terminal 44 for the gas-flow measuring element 10. In this circuit, voltage at a point A is set by the resistors 41 and 42, and by a power source voltage of the measuring element 10.

Figure 15:
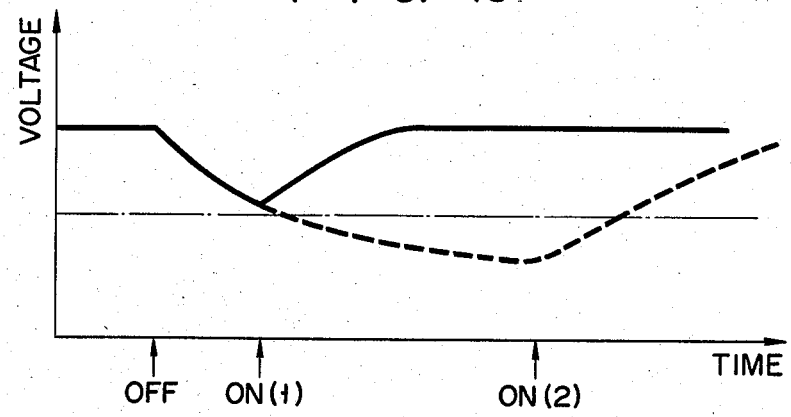
FIG. 15 is a graph showing the output signal from the circuit shown in FIG. 14.

As shown in FIG. 15, when the measuring element 10 is deenergized, the capacitor 43 is discharged through the resistors 41 and 42, so that the voltage at point A is gradually lowered. When the measuring element 10 is restarted (ON (1)) immediately after it is stopped, the voltage at point A is not lowered much, as indicated by the solid line. On the other hand, when the measuring element 10 is restarted (ON (2)) after a relatively long period of time, the voltage at point A is greatly decreased, as indicated by the dotted line. When this voltage is converted by the A/D converter 32, and the converted signal is detected, the fact that the engine was off can be determined. For example, when an initial value of the correction coefficient $R_S$ is changed by a potential at point A, the problems occurring when it is off for only a very short time, as shown in FIG. 13, can be effectively prevented.

Figure 16:
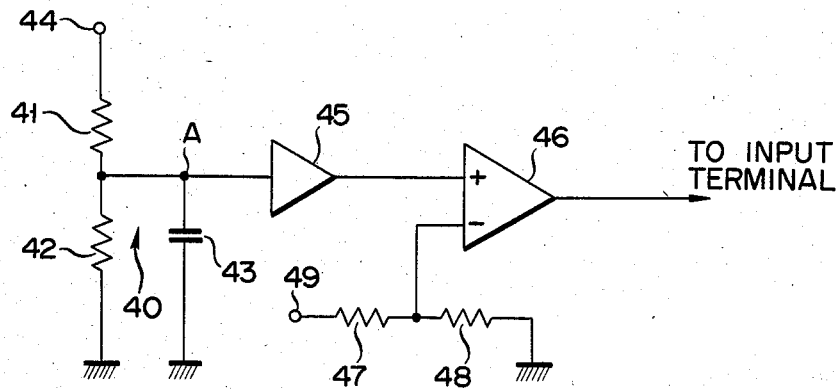
FIG. 16 is a circuit diagram explaining another means for measuring when the current is off.

FIG. 16 shows a circuit for discriminating when the engine is off so as to decrease the load on the A/D converter 32 and software. The voltage at point A of the same time constant circuit as in FIG. 14 is amplified by a buffer 45, and the amplified signal is compared by a comparator 46 with a reference voltage. The reference voltage is obtained such that a voltage applied to a terminal 49 is divided by resistors 47 and 48. When the voltage at point A is higher than the reference voltage (the time is short), the comparator 46 generates an output signal having a high level (H). When correction is performed in accordance with software in response to the signal of H level, excessive correction can be properly prevented.

A back-up counter is arranged for the input circuit 35 in FIG. 8 and is started when the power is turned off. In this case, the power source for this counter does not comprise a general commercial power source, but a battery. In this manner, even if all other components of the engine control unit are stopped, the counter can still be operated.

When power is resupplied to the engine control unit, the count of the back-up counter is read to cause the CPU 31 to detect now long the engine has been off.

The necessity of the start signal correction can be detected in accordance with the output from the measuring element 10 immediately after the element is energized. In this case, a simple circuit arrangement can be utilized. When the off time is sufficiently long, the output signal from the measuring element 10 includes a great error. The start signal correction is thus started when the output exceeds a predetermined value at the time of engine start or cranking. This detection operation is performed when the control circuit of the gas-flow measuring element 10 becomes stable after a predetermined period (e.g., after 0.1 to 0.4 seconds).

What is claimed is:

1. A gas-flow measuring apparatus comprising:
   means for measuring the quantity of said gas flow, said measuring means including:
   a heater mounted in said gas-flow; and
   temperature-responsive means, mounted in heat-conductive relationship to said heater and having a temperature which varies in accordance with said quantity of gas-flow, for providing an output signal corresponding to said temperature and thus to said quantity of gas-flow; means for providing power to said heater; and
   processing means for (a) detecting the start of power being provided to said heater, (b) counting time from when said start is detected, (c) detecting when said counted time is within a predetermined time interval when the temperature of said temperature-responsive means is effectively unrelated to said quantity of gas-flow, and (d) lowering a signal level of said output signal during said time interval to provide a corrected output signal.

2. Apparatus according to claim 1 wherein said measuring means includes a frame of heat-resistant material, said heater includes a heating wire, and said temperature-responsive means includes a resistive wire, said heating wire and said resistive wire being alternately wound around said frame in a parallel manner to cause said resistive wire to be heated by said heating wire.

3. Apparatus according to claim 1 wherein said measuring means is placed in an air-intake of an internal combustion engine, and wherein said processing means detects said start of power by detecting an operation of an ignition-switch in said engine.

4. Apparatus according to claim 1 wherein said processing means lowers said output signal level by an amount which varies in accordance with time counted within said time interval.

5. Apparatus according to claim 1 wherein said processing means (d1) receives from said measuring means an initial output signal corresponding to an initial state of said temperature of said temperature-responsive means immediately after said power is provided to said measuring means, (d2) determines a correction value to be applied to said output signal, said correction value varying as a function of the time counted from said initial state, and (d3) subtracts said correction value from said output signal to provide said corrected output signal.

6. Apparatus according to claim 1 wherein said processing means (d1') determines a correction coefficient to be applied to said output signal, said correction coefficient being sequentially updated by being multiplied by a predetermined value which is less than one, each time a predetermined period of time is counted within said time inteval, and (d2') lowers said output signal by multiplying it by said correction coefficient.

7. A gas-flow measuring apparatus comprising:
   means for measuring the quantity of said gas flow, said measuring means including:
   a heater mounted in said gas-flow; and
   temperature-responsive means, mounted in heat-conductive relationship to said heater an having a temperature which varies in accordance with said quantity of gas-flow, for providing an output signal corresponding to said temperature, and thus to said quantity of gas-flow;
   means for providing power to said heater, said power having a plurality of alternating start and stop periods;
   means for measuring an off-time between said stop of power and a subsequent start; and
   processing means for (a) detecting the start and stop of power being provided to said heater, (b) counting time from when said start is detected, (c) detecting when said counted time is within a predetermined time interval when the temperature of said temperature-responsive means is effectively unrelated to said quantity of gas flow, (d) lowering a signal level of said output signal during said time interval to provide a corrected output signal; and (e) adjusting said corrected output signal is accordance with said measured off-time period.

8. Apparatus according to claim 7 wherein said means for measuring said off-time period includes a time constant circuit.

9. Apparatus according to claim 7 wherein said means for measuring said off-time period includes a counter.

10. Apparatus according to claim 7 wherein said processing means (d1) determines a correction coefficient to be applied to said output signal, said correction coefficient being sequentially updated by being multiplied by a predetermined value which is less than one, each time a predetermined period of time is counted within said time interval, an initial correction coefficient being decreased by a value corresponding to said off-time period, and (d2) lowers said output signal by multiplying it by said correction coefficient.

11. Apparatus according to claim 7 wherein said means for measuring said off-time period includes a time constant circuit having a capacitor which is charged when power is provided to said measuring means, and a resistive circuit forming a discharge device for said capacitor, and wherein a signal corresponding to a voltage across said capacitor is provided to said processing means to adjust said output signal in accordance with said off-time period.

12. A gas-flow measuring apparatus for an internal combustion engine comprising:

means for measuring gas-flow in an intake air passage of said engine and generating an output signal indicative of the measured gas-flow, said measuring means including (a) heat generating element for generating heat, and (b) a temperature-responsive means for providing said output signal;

means, arranged in said intake air passage, for supporting thereon said heat generating element and said temperature-responsive means in heat conductive relation to each other;

means for supplying electric power to said heat generating means when said engine is in operation;

processing means for (a) measuring on-time elapsed from a time when said electric power is supplied to said heat generating element and (b) correcting said output signal with a correction value which decreases in accordance with said measured on-time.

13. A gas-flow measuring apparatus according to claim 12 further comprising:

means for measuring off-time elapsed from a time when said electric power ceases to be supplied to said heat generating element; and wherein said processing means increases an initial value of said correction value in accordance with said measured elapsed off-time.

14. A method of measuring a gas-flow comprising the steps of:

measuring the quantity of said gas-flow with a measuring means including a heater mounted in said gas-flow and a temperature-responsive means, mounted in heat-conductive relation to said heater and having a temperature which varies in accordance with said quantity of gas-flow, for providing an output signal corresponding to said temperature and thus to said quantity of gas-flow;

providing power to said heater;

detecting the start of power being provided to said heater;

counting time when said start is detected;

detecting when said counted time is within a predetermined time interval when the temperature of said temperature-responsive means is effectively unrelated to said quantity of gas flow; and lowering a signal level of said signal during said time interval to provide a corrected output signal.

15. A method according to claim 14 wherein said detecting the start step includes detecting a plurality of alternating starts and stops of power being provided to said heater, and further including the steps of:

measuring an off-time between a stop and a subsequent start; and adjusting said corrected output signal in accordance with said measured off-time.

* * * * *